(12) United States Patent
Wada et al.

(10) Patent No.: US 7,316,836 B2
(45) Date of Patent: Jan. 8, 2008

(54) OPTICAL RECORDING MEDIUM

(75) Inventors: Yutaka Wada, Miyagi (JP); Masatsugu Suwabe, Miyagi (JP); Toshihiro Akimori, Kanagawa (JP); Junko Shimada, Miyagi (JP); Keiji Oya, Saitama (JP); Koichi Shigeno, Tokyo (JP); Toru Yano, Chiba (JP)

(73) Assignee: Sony Corporation, Tokyo (JP)

( * ) Notice: Subject to any disclaimer, the term of this patent is extended or adjusted under 35 U.S.C. 154(b) by 116 days.

(21) Appl. No.: 10/973,444

(22) Filed: Oct. 27, 2004

(65) Prior Publication Data

US 2005/0094548 A1    May 5, 2005

(30) Foreign Application Priority Data

Oct. 31, 2003    (JP) ............................. 2003-373308

(51) Int. Cl.
*B32B 3/02*    (2006.01)
(52) U.S. Cl. .................. 428/64.1; 428/64.4; 428/64.8; 430/270.14
(58) Field of Classification Search .............. 428/64.8; 430/270.2
See application file for complete search history.

(56) References Cited

U.S. PATENT DOCUMENTS

| 4,656,121 A | * | 4/1987 | Sato et al. ............. 430/270.19 |
| 4,832,992 A | * | 5/1989 | Yabe et al. ................. 427/384 |
| 5,328,741 A |   | 7/1994 | Yanagisawa et al. |
| 5,391,413 A | * | 2/1995 | Yanagisawa et al. ...... 428/64.8 |
| 6,306,478 B1 | * | 10/2001 | Chen et al. ................ 428/64.1 |
| 2003/0224293 A1 | * | 12/2003 | Oya et al. .............. 430/270.14 |
| 2005/0031993 A1 | * | 2/2005 | Yano et al. ............ 430/270.21 |

FOREIGN PATENT DOCUMENTS

| DE | 101 12 278 A 1 |   | 9/2002 |
| JP | 2002-52829 |   | 2/2002 |
| JP | 2002-052829 | * | 2/2002 |
| JP | 2003-231359 | * | 8/2003 |

OTHER PUBLICATIONS

Patent Abstracts of Japan, JP 2003-231359, Aug. 19, 2003.

* cited by examiner

*Primary Examiner*—Elizabeth Mulvaney
(74) *Attorney, Agent, or Firm*—Oblon, Spivak, McClelland, Maier & Neustadt, P.C.

(57) ABSTRACT

An optical recording medium comprises a transmission substrate and a recording layer formed on the transmission substrate, the recording layer containing at least a dye material expressed by a general formula shown at the following chemical formula (in the chemical formula 1, R1 represents alkyl group having carbon numbers 1 to 4, R2, R3 represent alkyl group having carbon numbers 1 to 4, benzyl group or groups combined to form 3 to 6 rings, Y1 and Y2 independently represent organic groups and X represent $ClO_4$, $BF_4$, $PF_6$, $SbF_6$) and a dye material expressed by a general formula represented by the following chemical formula 2(in the chemical formula 2, R1 and R2 represent alkyl groups having carbon numbers 1 to 4, benzyl groups or groups combined to form 3 to 6 rings, Y1, Y2 independently represent organic groups and X represent $ClO_4$, $BF_4$, $PF_6$, $SbF_6$):

Chemical formula 1:

Chemical formula 2:

-continued

In a write once type optical recording medium such as DVD−R and DVD+R, satisfactory recording characteristics can be obtained from low-speed recording to high-speed recording.

21 Claims, 3 Drawing Sheets

OPTICAL RECORDING MEDIUM

BACKGROUND OF THE INVENTION

1. Field of the Invention:

The present invention relates to an optical recording medium, and particularly to an optical recording medium using an organic dye material as a recording layer.

2. Description of the Related Art:

An optical recording medium using an optical organic dye material as a recording layer includes a transparent substrate made of a suitable material such as a plastic on which a recording layer having an organic dye as a main component, a reflective layer, a protective layer and the like, if necessary, are laminated. Laser light is irradiated on the surface of this recording layer to form pits on the portions of the irradiated surface to record information with a high density.

Since organic dye recording mediums represented by CD-R (write once CD: Compact Disc, registered trademark) are simple in arrangement and can be manufactured inexpensively, they are widely used on the market as mediums for backing up data, image data and music data. However, in accordance with rapid development of computers in recent years, it is desired that the storage capacity of recording media should be increased more. Therefore, a demand of the optical recording medium using the organic dye is being shifted from the CD-R to DVD-R and DVD+R (write once DVD: Digital Versatile Disc, registered trademark).

Information is recorded on the optical recording medium using the organic dye in the heat mode. When laser light is irradiated on the recording layer, the organic dye on the irradiated portion absorbs the laser light and it is heated and thereby decomposed. The portion in which the organic dye is decomposed is different from the portion which is not decomposed in reflectivity so that pits are formed in the recording layer. For this reason, a heat absorption mechanism becomes important in the optical recording medium using the organic dye. A heat quantity necessary for decomposing the organic dye in the recording layer depends on absorption spectrum, whereby laser irradiation power is adjusted.

In the optical recording medium using this organic dye, a reflectivity characteristic and a recording sensitivity characteristic of the recording layer are important. These characteristics are deeply correlated with each other, which may exert a large influence on the recording characteristic of the optical recording medium. The DVD uses laser light with a wavelength of 650 nm (DVD-R) or 655 nm (DVD+R) which is shorter than that of the CD in order to increase the recording density. The organic dye that has been used so far in the CD-R has a large absorption in this wavelength region and its recording sensitivity is considerably shifted from the optimum recording sensitivity so that it cannot be used in the DVD-R and DVD+R.

Further, the DVD-R and DVD+R also are requested to perform high-speed recording similarly to the CD-R. The recording material for carrying out high-speed recording is requested to have a high reflectivity, a high recording sensitivity and a high decomposition speed for decomposing the dye by heat.

Various kinds of dye materials suitable for use with the DVD-R and the like have been proposed (see Cited Patent References 1 and 2, for example).

However, it cannot be said that recording and reproducing characteristics in the high-speed recording mode have been examined enough.

Further, if the recording mode is optimized as the high-speed recording mode by simply increasing the decomposition speed of the dye, then the signal characteristic in the low-speed recording mode is deteriorated unavoidably. Otherwise, if the recording mode is optimized to the low-speed recording mode, the signal characteristic in the high-speed recording mode is deteriorated. Accordingly, it is very difficult to maintain the recording characteristic from the low-speed recording mode to the high-speed recording mode by a single organic dye recording medium.

[Cited patent reference 1]: Official gazette of Japanese laid-open patent application No. 2002-52829

[Cited patent reference 2]: Official gazette of Japanese laid-open patent application No. 2003-231359

SUMMARY OF THE INVENTION

In view of the aforesaid aspect, it is an object of the present invention to provide a write once type optical recording medium such as DVD-R and DVD+R in which satisfactory recording characteristics can be obtained over a wide range from the low-speed recording mode to the high-speed recording mode.

According to an aspect of the present invention, there is provided an optical recording medium which is comprised of a transmission substrate and a recording layer formed on the transmission substrate, the recording layer containing at least a dye material expressed by a general formula shown at the following chemical formula (in the chemical formula 1, R1 represents alkyl group having carbon numbers 1 to 4, R2, R3 represent alkyl group having carbon numbers 1 to 4, benzyl group or groups combined to form 3 to 6 rings, Y1 and Y2 independently represent organic groups and X represent $ClO_4$, $BF_4$, $PF_6$, $SbF_6$) and a dye material expressed by a general formula represented by the following chemical formula 2 (in the chemical formula 2, R1 and R2 represent alkyl groups having carbon numbers 1 to 4, benzyl groups or groups combined to form 3 to 6 rings, Y1, Y2 independently represent organic groups and X represent $ClO_4$, $BF_4$, $PF_6$, $SbF_6$)

Chemical formula 1:

Chemical formula 2:

According to other aspect of the present invention, in the optical recording medium having the above-mentioned arrangement, the substrate has a groove formed along a recording track, the groove having a width Wg expressed as:

$$0.28 \text{ μm} \leq Wg \leq 0.40 \text{ μm}$$

and the groove having a depth D expressed as:

$$100 \text{ nm} \leq D \leq 200 \text{ nm}.$$

According to the present invention, in the optical recording medium having the above-mentioned arrangement, the dye material expressed by the general formula represented by the chemical formula 1 is a material expressed by a structural formula represented by the following chemical formula 3.

Chemical formula 3:

Further, according to the present invention, in the optical recording medium having the above-mentioned arrangement, the dye material expressed by the general formula represented by the chemical formula 1 is a material expressed by a structural formula represented by the following chemical formula 4:

Chemical formula 4:

Furthermore, according to other aspect of the present invention, the respective pigment materials have a weight ratio expressed as:

$$0 < W2/(W1+W2) \leq 0.7$$

where W1 represents the weight of the dye material described in said chemical formula 1 and W2 represents the weight of the dye material described in the chemical formula 2.

As described above, according to the present invention, there is provided the optical recording medium suitable for use as an application to a write once optical recording medium, in particular, the optical recording medium having the DVD type arrangement using the organic dye material. When the material of the recording layer is selected and the width and groove of the groove, in particular, are selected properly, satisfactory recording and reproducing characteristics, that is, jitter. value less than 9.0% and proper recording power characteristic can be obtained relative to a wide recording speed range from the 1× speed recording mode to the 8× speed recording mode.

Therefore, it is possible to provide a write once type optical recording medium having a DVD type arrangement which is useful in practical use and whose recording and reproducing characteristics are satisfactory.

According to the present invention, it is possible to provide a write once type optical recording medium in which high-speed recording characteristics are excellent.

Further, according to the present invention, it is possible to provide an optical recording medium with excellent high-speed recording characteristics and in which recording power required by high-speed recording and low-speed recording such as 1× speed recording mode can fall within a proper range.

Furthermore, according to the present invention, it is possible to provide an optical recording medium with excellent high-speed recording characteristics and in which recording power required by a low-speed recording mode can fall within a proper range and in which recording power required by a high-speed recording mode, in particular, 8× speed recording mode can reliably fall within a proper range.

DESCRIPTION OF THE PREFERRED EMBODIMENTS

Embodiments of the present invention will be described hereinafter. It is needless to say that the present invention is not limited to the following embodiments and that various changes and modifications could be effected therein.

In this embodiment, the present invention is applied to an organic dye disc, and an optical recording medium of which high speed recording characteristics can be improved when the present invention is applied to, in particular, a DVD–R disc and a DVD+R disc will be described below.

Figures 1, 2, 3:
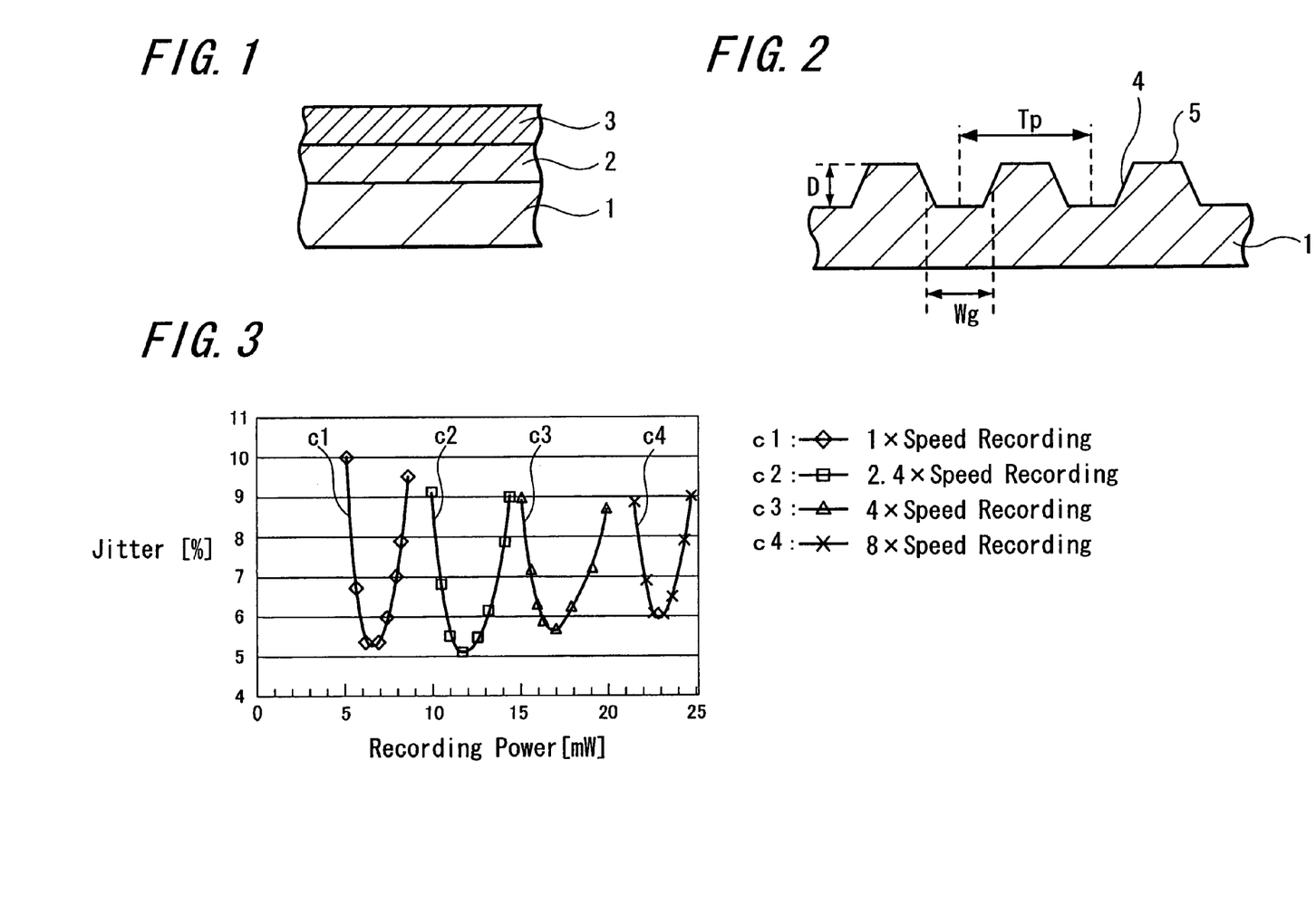
FIG. 1 is a schematic cross-sectional view showing an arrangement of an optical recording medium according to the present invention.
FIG. 2 is a cross-sectional view showing a main portion of the optical recording medium according to the present invention in an enlarged-scale.
FIG. 3 is a diagram showing the change of jitter relative to recording power according to the embodiment of the present invention.

FIG. 1 is a schematic cross-sectional view showing an arrangement of an optical recording medium according to the present invention. As shown in FIG. 1, a recording layer 2, made of a dye material, and a reflective layer 3 are deposited on a transmission substrate 1 made of a suitable material such as PC (polycarbonate) or PMMA (polymethyl methacrylate).

The dye material of the recording layer 2 may contain dye materials of the general formulas represented in the above-described chemical formulas 1 and 2.

For example, it is possible to use a dye material of the structural formula in the chemical formula 3 or 4 of the general formulas represented in the chemical formula 1.

Also, it is possible to construct an optical recording medium by adding a dye material of a structural formula represented in the following chemical formula 5, for example, of the general formula represented in the chemical formula 2.

Chemical formula 5:

A coating liquid of a dye material is dissolved into tetrafluoropropanol or the like which serves as a coating solvent relative to the organic dye comprising a recording layer and prepared. A recording layer is deposited on a transmission substrate having a thickness of 0.6 mm, for example, by a spin-coat method, and a reflective layer made of APC (Ag—Pd—Cu alloy), ANC (Ag—Nd—Cu alloy) and the like of silver alloy is laminated on the recording layer by a sputtering method.

Also, a film thickness of the recording layer is such one that may be selected in an optical recording medium using an ordinary organic dye material. In this embodiment, an optical density (OD) is defined by the following equation:

$$OD = -\log(T)$$

where T is a transmittance in the absorbed maximum wavelength λ max. The film thickness of the recording layer was selected so as to satisfy OD=0.50.

FIG. 2 is a cross-sectional view showing a main portion of the optical recording medium according to the present invention. As shown in FIG. 2, a groove 2 is formed on the surface of the substrate 1 used herein by an ordinary substrate manufacturing process, that is, from a stamper produced by an ordinary mastering process according to a suitable method such as an injection molding method or 2P (Photo-polymerization) method. A track pitch Tp was selected to be 0.74 μm, and a groove width Wg and a groove depth D were respectively selected to be 0.34 μm and 150 nm. In this embodiment, a width of an intermediate point of an inclined portion between the groove 4 and a land 5 is defined as the groove width Wg.

On the other hand, an optical tester, manufactured by Pulsetec Industrial Co. Ltd., under the trade name "DDU-1000), was used to record and reproduce a signal. A wavelength λ of laser light of this optical tester is 659 nm and a numerical aperture NA of a condenser lens is 0.65. A jitter value of a reproduces signal obtained when an EFM plus signal, used in the ordinary DVD, was recorded randomly was measured by this optical tester.

FIG. 3 shows measured results of recording and reproducing characteristics of an optical recording medium having a recording layer made by a material having a weight ratio W2/(W1+W2)=0.3 when W1 is the weight of the dye material shown in the chemical formula 3 and W2 is the weight of the dye shown in the chemical formula 5. When recording and reproducing characteristics were measured, jitter values relative to recording power were measured when 1× speed playback was carried out after 1× speed recording (linear velocity 3.5 m/s), 2.4× speed recording (linear velocity 8.4 m/s), 4× speed recording (linear velocity 14.0 m/s) had been carried out based on the Multi Strategy of the DVD+R× speed recording system standard and further 8× speed recording (linear velocity 27.9 m/s) had been carried out based on the Non-Multi Strategy of the DVD+R× speed recording system standard. In FIG. 3, solid lines c1 to Co. show measured results of 1× speed recording, 2.4× speed recording, 4× speed recording and 8× speed recording.

From the measured results of FIG. 3, it is to be understood that jitter bottoms are considerably lower than 9.0%, which is the upper limit value of the DVD+R standard, over all recording speeds from 1× speed to 8× speed.

Therefore, according to the present invention, it is clear that stable and satisfactory recording and reproducing characteristics can be obtained over a wide range from low-speed recording to high-speed recording.

Next, the recording layer was made of the dye materials shown in the chemical formulas 3 and 5, the adding amount of the dye material shown in the chemical formula 5 was added while it was being changed and the optical recording mediums were manufactured with conditions similar to those of the above-mentioned example, that is, with similar film thickness of the recording layer, similar groove width and similar groove depth and the like. Then, recording power P0 which serves as the jitter bottom when these optical recording mediums were recorded by 1× speed recording and 8× speed recording was measured. The measured results are shown by solid lines be and be in FIG. 4, respectively. A weight ratio was measured as a weight ratio W2/(W1+W2) of the material shown in the chemical formula 5 relative to the total weight where W1 is the weight of the dye shown in the chemical formula 3 and W2 is the weight of the dye shown in the chemical formula 5.

Figure 4:
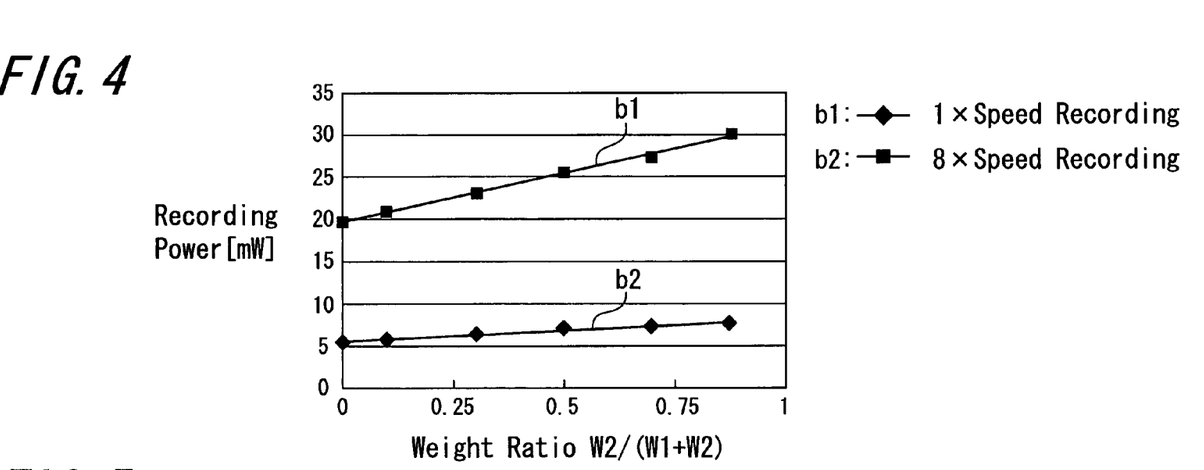
FIG. 4 is a diagram showing the changes of recording power relative to a weight ratio of a recording layer material according to the embodiment of the present invention.

As is clear from FIG. 4, the recording sensitivity is shifted to the low sensitivity side as the weight ratio W2/(W1+W2) of the dye shown in the chemical formula 5 so that recording sensitivity can be adjusted by adding the material shown by the general formula of the chemical formula 2.

It is desirable that the recording power which makes the jitter bottom should be less than 27 mW from the DVD standard. Accordingly, in order to make the recording power P0 which makes the jitter bottom in the 8× speed recording system become less than 27 mW, it is desirable that the weight ratio W2/(W1+W2) should be less than 0.7.

Also, this recording power P0 is selected to be larger than 5 to 6 mW from the DVD standard. Accordingly, a study of the measured results of recording power which makes the jitter bottom in the 1× speed recording mode reveals that it is desirable that the dye material shown in the chemical formula 5, that is, the chemical formula 2 should be added in order to adjust the recording sensitivity.

Figure 5:
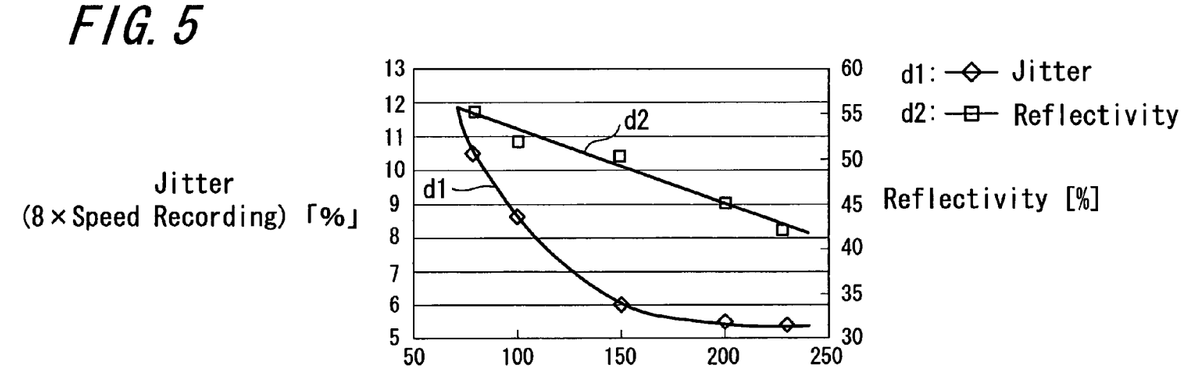
FIG. 5 is a diagram showing the changes of jitter and reflectivity relative to a groove depth according to the embodiment of the present invention.

Next, FIG. 5 shows examined results of the groove depth D. While the recording layer in which the mixed ratio of the organic dye materials shown in the chemical formulas 3 and 5 is selected as W2/(W1+W2) was used and the groove depth D was changed in a range of from 80 nm to 230 nm, a rest of arrangement was selected to be similar to that described in FIG. 3 and optical recording mediums were manufactured.

Jitter bottom values and reflectivities in the 8× speed recording mode were measured relative to respective groove depths D. In FIG. 5, solid lines do and ad show the jitter bottom value and the reflectivity, respectively. From the measured results of FIG. 5, it is clear that the jitter bottom value is decreased as the groove depth is increased and that the jitter bottom value becomes lower than 9% when the groove depth D is 100 nm.

Further, while the reflectivity also is decreased as the groove depth D is increased, when a wavelength of laser light is 200 nm, the reflectivity reaches 45% which is the lower limit of the reflectivity of the write once DVD standard. Accordingly, it is clear that the groove depth D which can satisfy the signal characteristic and the reflectivity at the same time falls within the following range:

$$100\ nm \leq D \leq 200\ nm$$

Figure 6:
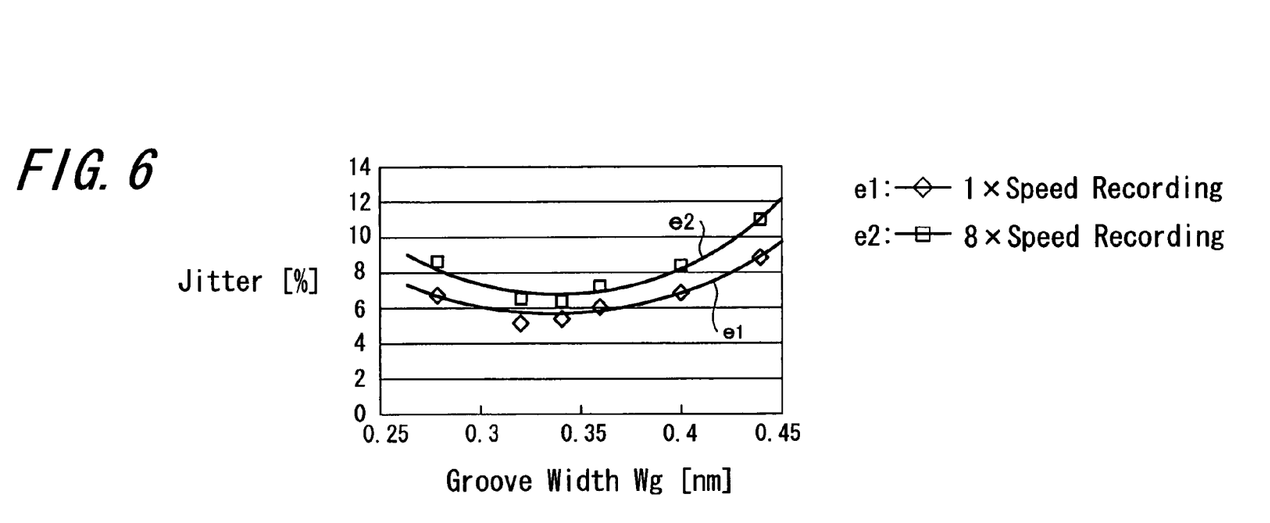
FIG. 6 is a diagram showing the changes of jitter relative to a groove width according to the embodiment of the present invention.

Further, FIG. 6 shows examined results with respect to the groove width Wg. While the recording layer with the condition in which the mixed ratio of the organic dye materials shown in the chemical formulas 3 and 5 was selected to be $W2/(W1+W2) = 0.3$ was used, other conditions such as the thickness of the recording layer and the groove depth and so on were selected similarly to the example described in FIG. 3 and the groove width Wg was selected in a range of from 0.28 μm to 0.44 μm, jitter values in 1× speed recording mode and 8× speed recording mode were measured and jitter values at the optimum recording power were plotted. In FIG. 6, solid lines ea. and ed show jitter values in the 1× speed recording mode and the 8× speed recording mode, respectively.

From the measured results of FIG. 6, it is to be understood that the groove width Wg may fall within a range of 0.28 μm ≦ Wg ≦ 0.40 μm in order to achieve the jitter value less than 9%.

Next, under the condition in which the mixed ratio of the dye materials shown in the chemical formulas 3 and 5 is selected to be $W2/(W1+W2)=0.3$, and a quencher expressed by the structural formula shown in the following chemical formula 6 was added to the dye materials and light resistance of the recording layer was checked. When W3 represents a weight of the dye material show n in the chemical formula 6, the quencher was added to the dye material in a range expressed as:

$$0 \leq W3/(W1+W2+W3) \leq 0.35$$

Then, the change of the light resistance of the recording layer was examined. A rest of arrangement, that is, the thickness of the recording layer, the groove depth and the groove width were selected similarly to the example described with reference to FIG. 3 and optical recording mediums were manufactured, where after the change of the light resistance of the recording layer was examined.

Chemical formula 6:

In the light resistance test of the recording layer, the recording layer and the reflective layer were laminated on the 0.6 mm-thick transmission substrate. Then, ultraviolet rays from a mercury-xenon lamp of 200 W were irradiated on the optical recording medium from the substrate side to deteriorate the dye film and reflected light amount obtained before and after the dye film was deteriorated were compared in a wavelength region from 590 nm to 680 nm.

When Ib. represents the reflected light amount of laser light obtained before irradiation of ultraviolet rays and I1 represents the reflected light amount of laser light obtained after irradiation of ultraviolet rays, while the mixed ratio $W3/(W1+W2+W3)$ of the materials shown in the chemical formulas 3 and 5 of the quencher of the structural formula shown in the chemical formula 6 relative to the total weight was being changed, a ratio Ib./I1 between the reflected light amounts obtained before and after the irradiation of ultraviolet rays and the jitter value before ultraviolet rays are irradiated were measured. The reflected light amount ratio and the jitter value are shown by solid lines go and go in FIG. 7, respectively.

Figure 7:
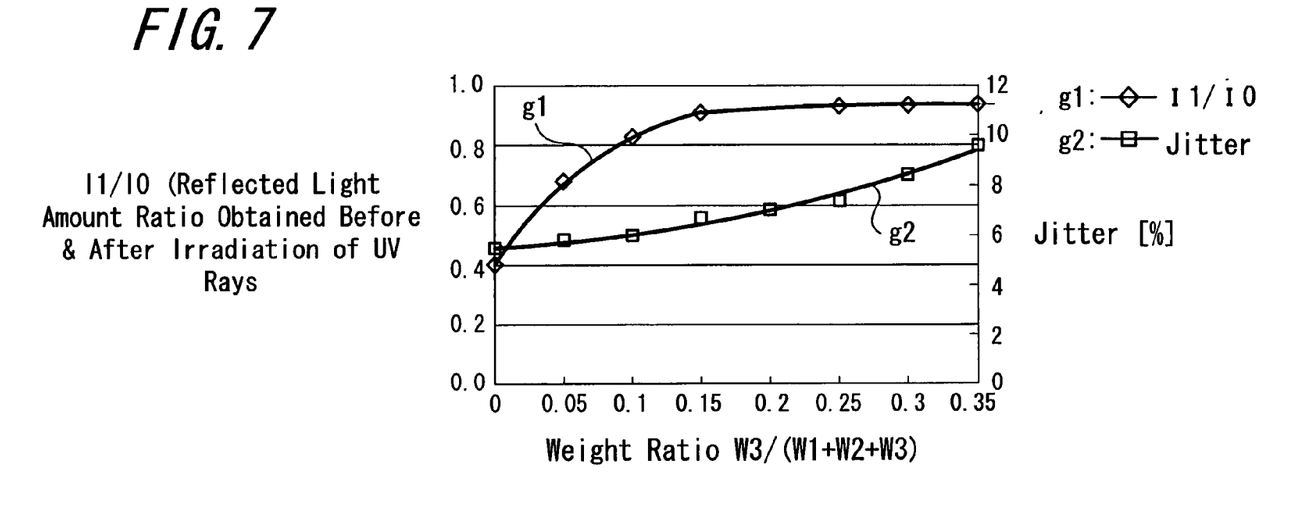
FIG. 7 is a diagram showing the changes of a reflected light amount ratio obtained before and after irradiation of ultraviolet rays and jitter relative to a weight ratio of a recording layer material according to the embodiment of the present invention.

From the measured results of FIG. 7, it can be confirmed that the light resistance of the recording layer was improved by increasing the mixed ratio $W3/(W1+W2+W3)$ of the quencher of the structural formula shown in the chemical formula 6. Since the CD–R which is now available on the market has the reflected light amount ratio of approximately I1/Ib.=0.8, in order to apply this standard to the optical recording medium, it is desirable that the weight ratio of the quencher should be selected so to fall within the following range:

$$W3/(W1+W2+W3) \geq 0.1$$

Also, when the weight ratio of the quencher falls within a range of $W3/(W1+W2+W3) > 0.3$, the jitter value exceeds 9% and hence the weight ratio of the quencher should suitably be selected in the following range:

$$0.1 \leq W3/(W1+W2+W3) \leq 0.3$$

While the material shown in the chemical formula 3 was used as the material expressed by the general formula shown in the chemical formula 1 in the above-mentioned respective examples, the present invention is not limited thereto and can use various kinds of organic dye materials included in the general formula of the chemical formula 1.

For example, the recording layer was made of the dye materials shown in the chemical formulas 4 and 2, other conditions, that is conditions such as thickness of recording layer, groove width and groove depth were selected to be similar to those described in FIG. 3 and an optical recording mediums was produced. Then, information was recorded on the optical recording medium in the 1× speed recording mode, the 2.4× speed recording mode, the 4× speed recording mode and the 8× speed recording mode by a method similar to that of the above-mentioned example and reproduced jitter values were measured. Even when the recording layer was made of the dye material shown in the chemical formula 4, the jitter values produced from the low-speed recording mode to the high-speed recording mode such as from 1× speed recording mode to 8× speed recording mode could be suppressed reliably and satisfactorily and the recording power P0 could be adjusted so as to fall within a proper range.

Further, when the recording layer was constructed by using the dye material shown in the chemical formula 4, by selecting the depth D and width Wg of the groove formed on the substrate in the above-mentioned ranges, that is, $$0.28\ \mu m \leq Wg \leq 0.40\ \mu m$$

$$100\ nm \leq D \leq 200\ nm$$

the jitter values could be made less than 9% and the reflectivity could be made higher than 45% similarly to the case in which the dye material shown in the chemical formula 3 was used to construct the recording layer.

Further, it is possible to improve the light resistance by adding various well-known quenchers, represented by the material shown in the chemical formula 6, to the recording layer of the optical recording medium having the arrangement according to the present invention.

The quencher was not limited to the material shown in the chemical formula 6 and other materials having structural formulas shown in the following chemical formulas 7 and 8, for example, could be used with light resistance being improved similarly.

Chemical formula 7:

Chemical formula 8:

As described above, according to the optical recording medium of the present invention, the write once type optical recording medium using cyanine-based dye and to which the optical system of the DVD±R is applied can obtain signal characteristics, which can sufficiently satisfy the write once type DVD standard, over a wide recording speed range from the 1× speed recording mode to the 8× speed recording mode and recording power can be adjusted so as to fall within a proper range.

In particular, when the recording layer was constructed by using the materials shown in the chemical formulas 3 and 4 of the material included in the general formula shown in the aforementioned chemical formula 1, recorded information that was recorded at respective recording speeds of the 1× speed recording mode to the 8× speed recording mode could be reproduced with the jitter value less than 9% a and the reflectivity could be increased in excess of 45%.

Further, from the aforementioned measured results of FIG. 3, it can easily be assumed that the optical recording medium according to the present invention can cope with high-speed recording mode higher than the 8× speed recording mode.

Also, while the thickness of the recording layer was selected so as to satisfy the above-mentioned equality of OD=0.50 in the above-mentioned respective examples, the present invention is not limited thereto and the thickness of the recording layer can be selected in a range in which the recording and reproducing characteristics are not affected, for example, in a range in which OD may fall within a range of from 0.3 to 0.7.

Further, it is possible to improve the light resistance of the recording layer by adding various kinds of quenchers represented by the organic dye materials shown in the chemical formulas 6 to 8.

While the present invention is applied to the optical recording medium having the DVD+R arrangement in the above-mentioned respective examples, the present invention is not limited thereto and the optical recording medium according to the present invention can be applied to other optical recording medium of DVD−R type format with similar satisfactory results being brought about.

The present invention is not limited to the above-mentioned embodiments and can be variously changed and modified without departing from the gist of the present invention in such a way as to apply the present invention to an optical recording medium having a double-layer arrangement of recording layers made of a dye material.

As described above, according to the present invention, there is provided the optical recording medium suitable for use as an application to a write once optical recording medium, in particular, the optical recording medium having the DVD type arrangement using the organic dye material. When the material of the recording layer is selected and the width and depth of the groove, in particular, are selected properly, satisfactory recording and reproducing characteristics, that is, jitter value less than 9.0% and proper recording power characteristic can be obtained relative to a wide recording speed range from the 1× speed recording mode to the 8× speed recording mode.

Therefore, it is possible to provide a write once type optical recording medium having a DVD type arrangement which is useful in practical use and whose recording and reproducing characteristics are satisfactory.

According to the present invention, it is possible to provide a write once type optical recording medium in which high-speed recording characteristics are excellent.

Further, according to the present invention, it is possible to provide an optical recording medium with excellent high-speed recording characteristics and in which recording power required by high-speed recording and low-speed recording such as 1× speed recording mode can fall within a proper range.

Furthermore, according to the present invention, it is possible to provide an optical recording medium with excellent high-speed recording characteristics and in which recording power required by a low-speed recording mode can fall within a proper range and in which recording power required by a high-speed recording mode, in particular, 8× speed recording mode can reliably fall within a proper range.

Having described preferred embodiments of the invention with reference to the accompanying drawings, it is to be understood that the invention is not limited to those precise embodiments and that various change and modifications could be effected therein by one skilled in the art without departing from the spirit or scope of the invention as defined in the appended claims.

What is claimed is:

1. An optical recording medium comprising:
a transmission substrate; and
a recording layer formed on said transmission substrate, said recording layer comprising a quencher, a first dye material expressed by chemical formula 1, and a second dye material expressed by chemical formula 2,
wherein said chemical formula 1 is where R1 represents alkyl group having carbon numbers 1 to 4, R2 and R3 represent alkyl group having carbon numbers 1 to 4, benzyl group or groups combined to form 3 to 6 rings, Y1 and Y2 independently represent organic groups, and X represent $ClO_4$, $BF_4$, $PF_6$, or $SbF_6$, said chemical formula 2 is where R1 and R2 represent alkyl groups having carbon numbers 1 to 4, benzyl group or groups combined to form 3 to 6 rings, Y1 and Y2 independently represent organic groups and X represent $ClO_4$, $BF_4$, $PF_6$, or $SbF_6$, and said quencher comprises at least one quencher selected from the group consisting of

2. The optical recording medium according to claim 1, wherein said transmission substrate has a groove formed along a recording track, and said groove has a width Wg expressed as 0.28 µm≦Wg≦0.40 µm and a depth D expressed as 100 nm≦D≦200 nm.

3. The optical recording medium according to claim 1, wherein said first dye material is a material expressed by chemical formula 3 which is 4. The optical recording medium according to claim 3, wherein said transmission substrate has a groove formed along a recording track, and said groove has a width Wg expressed as 0.28 µm≦Wg≦0.40 µm and a depth D expressed as 100 nm≦D≦200 nm.

5. The optical recording medium according to claim 1, wherein said first dye material is a material expressed by chemical formula 4 which is 6. The optical recording medium according to claim 5, wherein said transmission substrate has a groove formed along a recording track, and said groove has a width Wg expressed as 0.28 μm≦Wg≦0.40 μm and a depth D expressed as 100 nm≦D≦200 nm.

7. The optical recording medium according to claim 1, wherein said first and second dye materials have a weight ratio expressed as 0<W2/(W1+W2)≦0.7, where W1 represents a weight of said first dye material and W2 represents a weight of said second dye material.

8. The optical recording medium according to claim 2, wherein said first and second dye materials have a weight ratio expressed as 0<W2/(W1+W2)≦0.7, where W1 represents a weight of said first dye material and W2 represents a weight of said second dye material.

9. The optical recording medium according to claim 3, wherein said first and second dye materials have a weight ratio expressed as 0<W2/(W1+W2)≦0.7, where W1 represents a weight of said first dye material and W2 represents a weight of said second dye material.

10. The optical recording medium according to claim 4, wherein said first and second dye materials have a weight ratio expressed as 0<W2/(W1+W2)≦0.7, where W1 represents a weight of said first dye material and W2 represents a weight of said second dye material.

11. The optical recording medium according to claim 5, wherein said first and second dye materials have a weight ratio expressed as 0<W2/(W1+W2)≦0.7, where W1 represents a weight of said first dye material and W2 represents a weight of said second dye material.

12. The optical recording medium according to claim 6, wherein said first and second dye materials have a weight ratio expressed as 0<W2/(W1+W2)≦0.7, where W1 represents a weight of said first dye material and W2 represents a weight of said second dye material.

13. The optical recording medium according to claim 1, wherein 0.1≦W3/(W1+W2+W3)≦0 3 is satisfied where W1 is a weight of the first dye material, W2 is a weight of the second dye material and W3 is a weight of said quencher.

14. The optical recording medium according to claim 2, wherein 0.1≦W3/(W1+W2+W3)≦0.3 is satisfied where W1 is a weight of the first dye material, W2 is a weight of the second dye material find W3 is a weight of said quencher.

15. The optical recording medium according to claim 3, wherein 0.1≦W3/(W1+W2+W3)≦0.3 is satisfied where W1 is a weight of the first dye material, W2 is a weight of the second dye material and W3 is weight of said quencher.

16. The optical recording medium according to claim 4, wherein 0.1≦W3/(W1+W2+W3) 0.3 is satisfied where W1 is a weight of the first dye material, W2 is a weight of the second dye material and W3 is a weight of said quencher.

17. The optical recording medium according to claim 1, wherein a track pitch Tp of a recording track of said optical recording medium is selected to be 0.74 μm±0.03 μm, a shortest mark length is selected to be 0.40 μm, a wavelength λ of reproducing light for use in reading a recorded mark is selected to be $$650 \text{ nm} \begin{smallmatrix} +10 \text{ nm} \\ -5 \text{ nm} \end{smallmatrix} \text{ or } 655 \text{ nm} \begin{smallmatrix} +10 \text{ nm} \\ -5 \text{ nm} \end{smallmatrix}$$

and a numerical aperture NA of a condenser lens is selected to be 0.65±0.01.

18. The optical recording medium according to claim 2, wherein a track pitch Tp of a recording track of said optical recording medium is selected to be 0.74 μm±0.03 μm, a shortest mark length is selected to be 0.40 μm, a wavelength λ of reproducing light for use in reading a recorded mark is selected to be $$650 \text{ nm} \begin{smallmatrix} +10 \text{ nm} \\ -5 \text{ nm} \end{smallmatrix} \text{ or } 655 \text{ nm} \begin{smallmatrix} +10 \text{ nm} \\ -5 \text{ nm} \end{smallmatrix}$$

and a numerical aperture NA of a condenser lens is selected to be 0.65±0.01.

19. The optical recording medium according to claim 3, wherein a track pitch Tp of a recording track of said optical recording medium is selected to be 0.74 μm±0.03 μm, a shortest mark length is selected to be 0.40 μm, a wavelength λ of reproducing light for use in reading a recorded mark is selected to be $$650 \text{ nm} \begin{smallmatrix} +10 \text{ nm} \\ -5 \text{ nm} \end{smallmatrix} \text{ or } 655 \text{ nm} \begin{smallmatrix} +10 \text{ nm} \\ -5 \text{ nm} \end{smallmatrix}$$

and a numerical aperture NA of a condenser lens is selected to be 0.65±0.01.

20. The optical recording medium according to claim 4, wherein a track pitch Tp of a recording track of said optical recording medium is selected to be 0.74 μm±0.03 μm, a shortest mark length is selected to be 0.40 μm, a wavelength λ of reproducing light for use in reading a recorded mark is selected to be $$650 \text{ nm} \begin{smallmatrix} +10 \text{ nm} \\ -5 \text{ nm} \end{smallmatrix} \text{ or } 655 \text{ nm} \begin{smallmatrix} +10 \text{ nm} \\ -5 \text{ nm} \end{smallmatrix}$$

and a numerical aperture NA of a condenser lens is selected to be 0.65±0.01.

21. An optical recording medium according to claim 1, wherein said recording medium has a jitter value relative to the recoding power lower than 9.0% through a recording speed from 1× corresponding to a linear velocity of 3.5 m/s to 8× corresponding to a linear velocity of 27.9 m/s.

* * * * *